United States Patent [19]

Huang et al.

[11] 3,951,791

[45] Apr. 20, 1976

[54] METHOD FOR TREATING FOULED WATER

[75] Inventors: Ching Yun Huang, Minoo; Naomitsu Takashina, Fujisawa; Toshiaki Nishimura, Hiratsuka, all of Japan

[73] Assignee: Mitsubishi Gas Chemical Co., Ltd., Tokyo, Japan

[22] Filed: Sept. 7, 1973

[21] Appl. No.: 395,151

[30] Foreign Application Priority Data

Sept. 16, 1972 Japan................................ 47-92239

[52] U.S. Cl.................................... 210/47; 210/54
[51] Int. Cl.². ............................................ C02B 1/20
[58] Field of Search............................ 210/52–54, 210/47, 59

[56] References Cited
UNITED STATES PATENTS

| | | | |
|---|---|---|---|
| 3,453,207 | 7/1969 | Eck....................................... | 210/54 |
| 3,493,501 | 2/1970 | Eck....................................... | 210/54 |
| 3,790,476 | 2/1974 | Spoerle et al.......................... | 210/54 |
| 3,801,500 | 4/1974 | Webb et al. ........................... | 210/54 |

FOREIGN PATENTS OR APPLICATIONS 640,426   4/1962   Canada................................. 210/54

Primary Examiner—Charles N. Hart
Assistant Examiner—Peter A. Hruskoci
Attorney, Agent, or Firm—Stewart and Kolasch

[57] ABSTRACT

An aqueous dispersion of a polymer having a cationic charge on the surface of the polymer particles is used for treatment of fouled water. Said aqueous dispersion contains quaternary ammonium salt or inorganic or organic acid salt of a copolymer obtained by emulsion polymerization of, in the presence of a cationic surfactant, (a) 0.1 – 8.0% by weight based on total monomers of at least one $\alpha,\beta$-ethylenically unsaturated monomers containing basic nitrogen or at least one $\alpha,\beta$-ethylenically unsaturated monomers containing halogen and other (b) $\alpha,\beta$-ethylenically unsaturated monomers and/or (c) conjugate diene monomers, (b) and (c) being copolymerizable with said monomer (a). Said aqueous cationic dispersion is especially effective for treatment of fouled water containing anionic latexes.

8 Claims, No Drawings

METHOD FOR TREATING FOULED WATER

The present invention relates to a method for treating fouled water. More particularly, it concerns a method for treating fouled water which comprises treating fouled water containing anionic latexes or anionic resin emulsions such as paper-finishing waste liquor, fiber-finishing waste liquor or emulsion paint-containing waste liquor, thereby to efficiently aggregate the suspended solids in said fouled water to remove them therefrom.

Heretofore, as fundamental methods for removal of materials suspended or dissolved in fouled water, there are the precipitation method which comprises precipitating the suspended or dissolved materials, the filtration method which comprises filtering the fouled water through a filter having meshes of suitable size and the floatation method which comprises floating and removing fouling materials by allowing air bubbles to stick the fouling materials. However, some substances such as colloidal substances suspended stably in water due to their high surface charge or large particles stabilized with a high degree of hydration cannot effectively be treated by these methods. When such simple treatments are difficult or in order to increase efficiency of the treatment, a coagulant has usually been employed.

A well known inexpensive method is a method according to which an inorganic electrolyte such as aluminum sulfate, aluminum chloride, ferrous sulfate, ferric sulfate, etc. is added to neutralize surface charge of suspended solids. However, satisfactory effect is hard to be attained because of low floc forming ability of the inorganic electrolyte for the suspended solids and furthermore, amount of sludge becomes greater because addition of the inorganic electrolyte in a large amount is required and in some case addition of auxiliary agent such as quicklime, calcium hydroxide is required. In order to improve drawbacks, it has been known to use as precipitant or coagulant water soluble high molecular compounds such as polyacrylamide, polyacrylic acid and salts thereof, polyacryamide partial hydrolysates, polyethyleneimine, quaternary ammonium salts of aminated polystyrene, polyamine sulfone, etc. However, according to such method which uses these water soluble high polymer, it is necessary for increasing the aggregation ability that said water soluble high polymer should have very high molecular weight. As the result, it is difficult to dissolve it in water and moreover when they are applied to fouled water, diffusibility thereof is not good. Furthermore, although these conventional methods are effective when surface charge of the suspended solids is low, or the particle size of suspended solids is relatively large, it is extremely difficult to effectively aggregate suspended solids with an extremely small particle size and a high surface charge, such as anionic latexes which exist as markedly stable colloid in water.

The object of the present invention is to provide a method for effectively treating fouled water containing said latexes or resin emulsions as suspended solids.

The present invention relates to a method for treating fouled water, especially those containing anionic latexes or anionic resin emulsions, which comprises using as a treating agent an aqueous dispersion obtained by emulsion polymerization of (a) an $\alpha,\beta$-ethylenically unsaturated monomer containing basic nitrogen capable of forming quaternary ammonium salts or inorganic or organic acid salts and (b) other $\alpha,\beta$-ethylenically unsaturated monomer and/or (c) a conjugate diene monomer, both (b) and (c) being copolymerizable with (a), in the presence of a relatively hydrophobic cationic surfactant and then allowing to form said salt. Alternatively, an $\alpha,\beta$-ethylenically unsaturated monomer containing halogen capable of reacting with basic nitrogen to form a quaternary ammonium salt may be used as (a).

Said aqueous dispersion used in the method of the present invention has a high cationic charge on the surface of the polymer particles.

Said aqueous dispersion having a high cationic charge on the surface of the particles can be obtained as follows: That is, (a) $\alpha,\beta$-ethylenically unsaturated monomer selected from basic nitrogen-containing $\alpha,\beta$-ethylenically unsaturated monomers and halogen-containing, $\alpha,\beta$-ethylenically unsaturated monomers and (b) other $\alpha,\beta$-ethylenically unsaturated monomer and/or (c) conjugate diene monomer copolymerizable with (a) are emulsion polymerized in the presence of a cationic surfactant and a polymerization initiator to obtain a copolymer. An amount of (a) is 0.1 to 8.0% by weight based on the total monomer and that of (b) and (c) the balance. When nitrogen-containing monomers are used, the copolymer is quaternarized with benzyl chloride methyl iodide, dimethyl sulfate, etc. or neutralized with inorganic or organic acids such as hydrochloric acid, sulfuric acid, nitric acid, acetic acid, formic acid, propionic acid, etc. In case halogen-containing monomers are used, the copolymer is treated with basic nitrogen compounds such as trimethylene, pyridine, etc.

The $\alpha,\beta$-ethylenically unsaturated monomers containing basic nitrogen capable of forming quaternary ammonium salts or mineral acid salts or organic acid salts which are used in production of the aqueous dispersion of polymers having cationic charge, which are used in the method of the present invention are, for example, dialkylaminoalkyl methacrylates or dialkylaminoalkyl acrylates such as dimethylaminoethyl acrylate, dimethylaminoethyl methacrylate, diethylaminoethyl acrylate, diethylaminoethyl methacrylate, etc., vinyl substituted pyridines such as 2-vinylpyridine, 4-vinylpyridine, etc. and N,N-dialkyl-ar-vinylbenzylamines such as N,N-dimethyl-ar-vinylbenzylamine, N,N-diethyl-ar-vinylbenzylamine, etc.

The halogen-containing $\alpha,\beta$-ethylenically unsaturated monomers mean, $\alpha,\beta$-ethylenically unsaturated monomers containing halogens capable of easily reacting with basic nitrogen to form ammonium salts and examples thereof are 2-chloroethyl methacrylate, 2-bromoethyl methacrylate, 2-chloroethyl acrylate, 2-bromoethyl acrylate, 2- or 4-chloromethylstyrene, 2- or 4-chloromethyl-$\alpha$-methylstyrene, etc.

These basic nitrogen-containing ethylenically unsaturated monomers or halogen-containing ethylenically unsaturated monomers may be used in an amount of 0.1 – 8.0% by weight, more preferably 1.0 – 5.0% by weight based on total monomers. When the amount of said monomers is outside of said range, namely, when it is less than 0.1% by weight, stability of the aqueous dispersion obtained is very low and it is unsuitable for treatment according to the method of the present invention. When the amount of said monomers is more than 8.0% by weight, the aqueous dispersion for treatment according to the method of the present invention is too stable to aggregate suspended solids in fouled water.

Furthermore, examples of other α,β-ethylenically unsaturated monomers and/or conjugate diene monomers to be copolymerized with said basic nitrogen-containing α,β-ethylenically unsaturated monomers or halogen-containing α,β-ethylenically unsaturated monomers are as follows: styrene and its derivatives, alkyl acrylates such as methyl acrylate, ethyl acrylate, and butyl acrylate, alkyl methacrylates such as methyl methacrylate, ethyl methacrylate and butyl methacrylate, vinyl acetate, vinyl propionate, ethylene, vinyl chloride, isoprene, 1,3-butadiene, etc. These monomers may be used in optional combination and proportion. Preferred monomers among them are styrene, 1,3-butadiene and isoprene.

The cationic surfactants used in the present invention are compounds represented by the general formula:

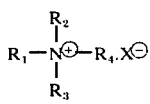

wherein $R_1$ is an alkyl group of $C_{15}$ - $C_{19}$, $R_2$ - $R_4$ are alkyl groups of $C_1$ - $C_3$ and X is a halogen. Examples of these compounds are hexadecyltrimethylammonium chloride, heptadecyltrimethylammonium chloride, octadecyltrimethylammonium chloride, hexadecyltrimethylammonium bromide, heptadecyltrimethylammonium bromide, octadecyltrimethylammonium bromide, etc. Said surfactant may be used in an amount of 0.5 – 7.0 parts by weight, preferably 1.0 – 2.0 parts by weight per 100 parts by weight of the total monomers. When an aqueous dispersion obtained by using the surfactant in an amount of less than said range is employed in the method of the present invention, its stability in fouled water is low and before being sufficiently diffused the aqueous dispersion itself aggregates and suspended solids in the fouled water cannot effectively be aggregated. When the amount of said surfactant used exceeds said range, the aqueous dispersion used in the method of the present invention cannot completely aggregate and precipitate the suspended solids in the fouled water. In the production of the aqueous dispersion used in the present invention, if necessary, mercaptans as a molecular weight regulating agent and aluminum chloride, aluminum sulfate, etc. as an electrolyte may be used additionally.

The thus obtained aqueous dispersion used in the present invention is an aqueous dispersion of copolymer having high cationic charge on the surface of particles. When fouled water in which anionic latexes or anionic resin emulsion are suspended as a very stable colloid are treated with said aqueous dispersion, this aqueous dispersion adsorbs the suspended solids and easily causes aggregation. The resultant aggregate forms large flocs which precipitate and hence can be easily removed by filtration.

Said aqueous dispersion of copolymer is usually used in an amount of 0.1 – 15 parts by weight (as solid) per 100 parts by weight of the suspended solids in the fouled water, but the amount somewhat varies depending on stability of the suspended solids in water and the nature of suspended solids. The dispersion is used in an amount which is suitably determined before use by pre-examination.

The present invention will be illustrated by referring to the following Examples in which "part" is by weight, "light transmittance" is the transmittance measured by an automatic recording spectrophotometer (EPS-3T manufactured by Hitachi Co., Ltd.) as a wavelength of 700 mμ and "ζ-potential" is a ζ-potential of particles of aqueous dispersion measured in a buffer solution with ionic strength of 0.07 and pH of 6.0 at 20°C.

EXAMPLE 1

Fortyfive parts of 1,3-butadiene, 50 parts of styrene, 5 parts of N,N-diethylaminoethyl acrylate, 2 parts of heptadecyltrimethylammonium bromide, 0.1 part of laurylmercaptan, 0.2 part of potassium persulfate and 150 parts of deionized water were charged in a nitrogen flushed reactor and were agitated at 60°C for 3.0 hours. Thereafter, 4 parts of benzyl chloride were added thereto and temperature was elevated to 80°C and the reaction was effected with agitation for further 12 hours to obtain a cationic aqueous dispersion with 100% conversion, solid concentration of 40.5% and ζ-potential of +53mV.

A fouled water containing anionic latexes discharged from surface treating process of paper with an anionic latex was subjected to treating test with thus obtained cationic latex. That is, 1000 ml of fouled water comprising mainly copolymer of styrene-1,3-butadiene-methacrylic acid with a minor amount of casein and clay and having a concentration of solid of 0.09%, a light transmittance of 0% and a pH of 6.5 was charged in a jar tester, to which 9.8 parts (as solid) of the cationic latex every 100 parts of suspended solid was added and they were agitated. At this time, the suspended solids which were stably suspended immediately began to aggregate and precipitate. After lapse of 3 minutes, the light transmittance of supernatant liquid was 99.4%. For comparison, polyethyleneimine and quaternary ammonium salt of aminated polyacrylamide were tested under the same conditions as mentioned above to find that both began to aggregate after lapse of 30 minutes, but flocs were small. Further, when said treated liquid was left to stand for 30 minutes and filtered through a filter of 100 mesh, the light transmittance of the filtrate was 85.0%.

EXAMPLE 2

A copolymer latex of 1,3-butadiene methyl methacrylate was treated with the same cationic aqueous dispersion as used in Example 1. That is, an aqueous dispersion of anionic latex of methyl methacrylate-1,3-butadiene copolymer produced using a major amount of anionic surfactant and a minor amount of non-ionic surfactant, which had a solid concentration of 0.08%, a pH of 7.6 and a light transmittance of 29% was prepared. To 1000 ml of this aqueous dispersion was added the cationic aqueous dispersion of Example 1 in an amount of 6.0 parts (as solid) per 100 parts of the methyl methacrylate-1,3-butadiene copolymer and the test was carried out under the same conditions as in Example 1. Immediately, aggregation occurred and the light transmittance of supernatant liquid after lapse of 3 minutes was 99.7%. For comparison, completely the same tests were carried out with dodecyltrimethylammonium chloride, aluminum sulfate, polyethyleneimine, and quaternary ammonium salt of aminated polyacrylamide. However, in case of the former two, no aggregation occurred even after lapse of 60 minutes and in case of the latter two, aggregation began after lapse of 60 minutes, but flocs large enough to cause precipitation were not formed. Said treated liquid was filtered through a filter of 100 mesh. The light transmittance of the filtrate was 81.0%.

EXAMPLE 3

A cationic aqueous dispersion having 100% conversion, solid concentration of 40.3% and $\zeta$-potential of +51mV was produced in the same manner as in Example 1 except that 12 parts of 10% an aqueous solution of HCl was added in place of benzyl chloride and then the temperature was elevated to 70°C and reaction was effected under stirring for further 3.0 hours. The fouled water used in Example 1 was treated with the thus prepared cationic aqueous dispersion under the same conditions as in Example 1. Immediately after addition of the treating agent, aggregation began and the light transmittance after lapse of 3 minutes was 99.1%.

EXAMPLE 4

Forty parts of isoprene, 55 parts of butyl methacrylate, 5 parts of N,N-dimethyl-ar-vinylbenzlamine, 1.2 parts of hexadecyltrimethylammonium chloride, 0.2 part of potassium persulfate, 0.01 part of laurylmercaptan, 0.3 part of aluminum sulfate and 150 parts of deionized water were charged in a nitrogen flushed reactor and they were allowed to react with agitation at 60°C for 4 hours. Then, 4.6 parts of methyl iodide was added and the temperature was elevated to 80°C and reaction with agitation was continued for further 13 hours to obtain a cationic aqueous dispersion having 100% conversion, solid concentration of 40.2% and $\zeta$-potential of +51.8mV.

Fouled water discharged from non-woven fabric production process and containing anionic latexes was treated with the thus prepared cationic aqueous dispersion. That is, 1000 ml of fouled water having a suspended solid concentration of 0.12%, pH of 7.5 and a light transmittance of 5% and containing mainly acrylonitrile-butadiene copolymer latex with a minor amount of melamine resin was charged in a jar tester. To this fouled water was added said cationic aqueous dispersion in an amount of 13 parts (as solid) per 100 parts by weight of the suspended solid and they were agitated. After lapse of 3 minutes from the addition, aggregation began and the light transmittance of supernatant liquid after laps of 7 minutes was 96.7%.

For comparison, a quaternary ammonium salt of aminated polyacrylamide was used to find that no aggregation occurred after 60 minutes regardless of the amount thereof.

EXAMPLE 5

Seventythree parts of 1,3-butadiene, 25 parts of methyl methacrylate, 2 parts of 4-vinylpyridine, 2.4 parts of octadecyltrimethylammonium chloride, 0.3 part of potassium persulfate, 0.1 part of laurylmercaptan, 0.5 part of aluminum chloride and 150 parts of deionized water were charged in a nitrogen flushed reactor. Agitation was conducted at 60°C for 3.0 hours. Thereafter, 3 parts of a 10% aqueous solution of HCl was added thereto and the temperature was elevated to 70°C and the reaction was continued for further 3.0 hours under stirring to obtain a cationic aqueous dispersion having 100% conversion, solid concentration of 40.1% and $\zeta$-potential of +52.0mV. The fouled water, which was the same as in Example 1 was subjected to a treatment with the cationic aqueous dispersion under the same conditions as in Example 1. After lapse of 4 minutes from addition of the treating agent, aggregation began and the light transmittance of supernatant liquid after lapse of 7 minutes was 98.4%.

EXAMPLE 6

A fouled water containing natural rubber latex discharged from foam rubber production process was subjected to a treating test with the cationic aqueous dispersion of Example 5.

That is, 7.3 parts (as solid) of the cationic aqueous dispersion per 100 parts of the suspended solids was added to 1,000 ml of the fouled water which contained a lot of natural rubber latex and a little amount of sulfur, zinc white, etc. and which had a concentration of the suspended solids of 0.04%, a pH of 7.8 and a light transmittance of 26%. The same test as in Example 1 was carried out. Aggregation immediately began and the light transmittance of supernatant liquid after lapse of 3 minutes was 99.2%.

EXAMPLE 7

Seventy parts of 1,3-butadiene, 24 parts of butyl methacrylate, 6 parts of 2-chloromethylstyrene, 3.5 parts of octadecyltrimethylammonium bromide, 0.2 part of potassium persulfate, 0.01 part of laurylmercaptan, 0.3 part of aluminum chloride and 150 parts of deionized water were charged in a nitrogen flushed reactor and they were allowed to react with agitation at 60°C for 4.0 hours. Thereafter, 4.6 parts of pyridine was added thereto and temperature was elevated to 80°C and the reaction with agitation was continued for 16 hours to obtain a cationic aqueous dispersion having 100% conversion, solid concentration of 40.3% and $\zeta$-potential of +54mV.

Example 1 was repeated, but the thus obtained cationic aqueous dispersion was used. Immediately after the addition of the cationic aqueous dispersion, aggregation began and the light transmittance of supernatant liquid after lapse of 3 minutes was 96.7%.

EXAMPLE 8

Sixtyfive parts of 1,3-butadiene, 33 parts of acrylonitrile, 2 parts of 2-chloroethyl acrylate, 3 parts of hexadecyltrimethylammonium bromide, 0.2 part of potassium persulfate, 0.02 part of laurylmercaptan, 0.1 part of aluminum chloride and 150 parts of deionized water were charged in a nitrogen flushed reactor. The mixture was agitated at 60°C for 4.0 hours. Thereafter, 3.3 parts of triethanolamine was added and temperature was elevated to 80°C. The reaction was further continued with agitation for 16 hours to obtain a cationic aqueous dispersion having 100% conversion, solid concentration of 40.1% and $\zeta$-potential of +48.5mV.

Example 1 was repeated, but the cationic aqueous dispersion as prepared above was used. Immediately after addition of said cationic aqueous dispersion, aggregation began and the light transmittance of supernatant liquid after lapse of 3 minutes was 97.1%.

EXAMPLE 9

Sixtyfive parts of styrene, 34.5 parts of butyl acrylate, 0.5 part of 2-chloroethyl methacrylate, 4.5 parts of heptadecyltrimethylammonium chloride, 0.2 part of ammonium persulfate, 0.01 part of laurylmercaptan, 0.2 part of aluminum chloride and 150 parts of deionized water were charged in a nitrogen flushed reactor and they were allowed to react with agitation at 60°C for 3 hours. Then, 0.4 part of trimethylamine was added thereto and temperature was elevated to 80°C. The reaction was continued with agitation for 15 hours to obtain a cationic aqueous dispersion having 100% conversion, a solid concentration of 40.3%, and $\zeta$-potential of +45mV.

Example 4 was repeated, but the above cationic aqueous dispersion was used.

After lapse of 3 minutes from addition of said cationic aqueous dispersion, aggregation began and the light transmittance of supernatant liquid after lapse of 7 minutes was 92.7%.

We claim:

1. A method for flocculating solid particles suspended in fouled water containing anionic latexes or anionic resin emulsions which comprises adding to said fouled water 0.1 to 15 parts by weight, based on 100 parts of the suspended solid in the fouled water, of a cationic aqueous dispersion of a copolymer having a quaternary ammonium salt form or an inorganic or organic acid salt form, which is obtained by the emulsion polymerization of (a) 0.1 to 8.0% by weight, based on the weight of the total monomers, of at least one $\alpha,\beta$-ethylenically unsaturated monomer containing basic nitrogen atoms or at least one $\alpha,\beta$-ethylenically unsaturated monomer containing halogen atoms capable of forming an ammonium salt with a basic nitrogen atom, (b) a $\alpha,\beta$-ethylenically unsaturated monomer and (c) a conjugated diene monomer, in the presence of a polymerization initiator and 0.5 to 7.0 parts by weight per 100 parts by weight of the total monomers of a cationic surfactant and followed by reacting with a quaternary ammonium salt forming agent or, in the case of using monomers containing a basic nitrogen atom, by reacting with an inorganic or organic acid.

2. A method according to claim 1, wherein the amount of (a) is 1.0 – 5.0% by weight based on the weight of the total monomers.

3. A method according to claim 1, wherein the $\alpha,\beta$-ethylenically unsaturated monomers containing basic nitrogen are selected from the group consisting of dialkylaminoalkyl acrylates, dialkylaminoalkyl methacrylate, vinyl substituted pyridines and N,N-dialkyl-ar-vinylbenzylamines.

4. A method according to claim 1, wherein the cationic surfactant has the general formula:

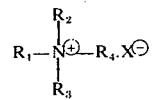

(wherein $R_1$ is an alkyl group of $C_{15}$ - $C_{19}$, $R_2, R_3$ and $R_4$ are alkyl groups of $C_1$ - $C_3$ and X is a halogen atom).

5. A method according to claim 1, wherein the cationic surfactant is selected from the group consisting of hexadecyltrimethylammonium chloride, heptadecyltrimethylammonium chloride, octadecyltrimethylammonium chloride, hexadecyltrimethylammonium bromide, heptadecyltrimethylammonium bromide, and octadecyltrimethylammonium bromide.

6. A method according to claim 1, wherein the other ethylenically unsaturated comonomer is selected from the group consisting of styrene, styrene derivatives, alkyl acrylates, and alkyl methacrylates.

7. A method according to claim 1, wherein the conjugate diene monomer is selected from the group consisting of isoprene and butadiene.

8. A method according to claim 1, wherein the $\alpha,\beta$-ethylenically unsaturated monomer containing halogen atoms is selected from the group consisting of 2-chloroethyl methylacrylate, 2-bromoethyl methylacrylate, 2-chloroethyl acrylate, 2-bromoethyl acrylate, 2- or 4-chloromethyl styrene and 2- or 4-chloromethyl-$\alpha$-methyl styrene.

* * * * *